United States Patent
Lena et al.

(10) Patent No.: US 9,918,364 B2
(45) Date of Patent: Mar. 13, 2018

(54) ELECTRONIC CIRCUIT FOR DRIVING LED STRINGS INCLUDING A PLURALITY OF REGULATION MODULES WHICH FUNCTION IN SEQUENCE

(71) Applicant: STMicroelectronics S.r.l., Agrate Brianza (IT)

(72) Inventors: Davide Lena, Turin (IT); Simone Crespi, San Vero Milis (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 15/604,811

(22) Filed: May 25, 2017

(65) Prior Publication Data

US 2017/0265257 A1    Sep. 14, 2017

Related U.S. Application Data

(63) Continuation of application No. 15/162,289, filed on May 23, 2016, now Pat. No. 9,730,285.

(51) Int. Cl.
   *H05B 33/08* (2006.01)

(52) U.S. Cl.
   CPC ....... *H05B 33/083* (2013.01); *H05B 33/0812* (2013.01); *H05B 33/0842* (2013.01)

(58) Field of Classification Search
   USPC ............... 315/185 R, 224, 294, 307, 200 R
   See application file for complete search history.

(56) References Cited

U.S. PATENT DOCUMENTS

| | | | |
|---|---|---|---|
| 6,989,807 B2 | 1/2006 | Chiang | |
| 7,081,722 B1 | 7/2006 | Huynh et al. | |
| 7,233,115 B2 * | 6/2007 | Lys | F21S 48/325 |
| | | | 315/224 |

(Continued)

FOREIGN PATENT DOCUMENTS

| | | |
|---|---|---|
| EP | 2645816 A1 | 10/2013 |
| KR | 20150015376 A | 2/2015 |
| WO | WO-2014209009 A1 | 12/2014 |

OTHER PUBLICATIONS

2015 Microchip Technology Inc. Data Sheet CL8800, "Sequential Linear LED Driver," D5200053571, pp. 1-14.

(Continued)

*Primary Examiner* — Douglas W Owens
*Assistant Examiner* — Syed M Kaiser
(74) *Attorney, Agent, or Firm* — Gardere Wynne Sewell LLP

(57) ABSTRACT

An electronic circuit drives a plurality of LED strings connected in series. The electronic circuit includes a regulation module corresponding to each LED string, with the regulation module connected to the cathode terminal of the corresponding LED string. Each regulation module is further coupled to receive a reference voltage in phase with a rectified a.c. voltage. The regulation modules execute in turn and in sequence a current-regulation phase as a function of a trend of the reference voltage. Each regulation module, when executing the current-regulation phase, functions to regulate the current that flows in the corresponding LED string and in any previous LED strings in the series connection so that the regulated current is proportional to the reference voltage.

19 Claims, 5 Drawing Sheets

(56) References Cited

U.S. PATENT DOCUMENTS

| | | | |
|---|---|---|---|
| 7,511,437 B2* | 3/2009 | Lys | H02M 1/4225 315/224 |
| 8,049,439 B2* | 11/2011 | Zhao | H05B 33/0815 315/297 |
| 8,288,960 B2 | 10/2012 | Chiang et al. | |
| 8,521,035 B2 | 8/2013 | Knapp et al. | |
| 8,742,682 B1 | 6/2014 | Wang et al. | |
| 9,000,674 B2 | 4/2015 | Lynch et al. | |
| 9,210,772 B2 | 12/2015 | Maiwald | |
| 2004/0135560 A1* | 7/2004 | Kernahan | H02M 3/157 323/282 |
| 2007/0267978 A1 | 11/2007 | Shteynberg et al. | |
| 2009/0058323 A1* | 3/2009 | Yang | H05B 33/0818 315/307 |
| 2009/0230874 A1* | 9/2009 | Zhao | H05B 33/0815 315/192 |
| 2009/0230891 A1* | 9/2009 | Zhao | H05B 33/0815 315/308 |
| 2010/0156315 A1* | 6/2010 | Zhao | H05B 33/0818 315/294 |
| 2010/0164400 A1 | 7/2010 | Adragna | |
| 2010/0194298 A1 | 8/2010 | Kuwabara | |
| 2010/0207534 A1 | 8/2010 | Dowling et al. | |
| 2010/0327764 A1 | 12/2010 | Knapp | |
| 2011/0169418 A1 | 7/2011 | Yang et al. | |
| 2011/0193489 A1 | 8/2011 | Moss | |
| 2011/0227497 A1 | 9/2011 | Hu et al. | |
| 2011/0273102 A1 | 11/2011 | van de Ven et al. | |
| 2011/0292704 A1* | 12/2011 | Makino | H02M 1/4208 363/126 |
| 2012/0081009 A1 | 4/2012 | Shteynberg et al. | |
| 2012/0154260 A1 | 6/2012 | Decraemer et al. | |
| 2012/0176066 A1* | 7/2012 | Lin | H05B 33/0815 315/307 |
| 2012/0217882 A1 | 8/2012 | Wong et al. | |
| 2012/0326631 A1* | 12/2012 | Naruo | H05B 33/0866 315/297 |
| 2013/0257282 A1 | 10/2013 | Van Den Berg et al. | |
| 2013/0320850 A1* | 12/2013 | Nakamura | F21S 48/1747 315/82 |
| 2013/0320880 A1 | 12/2013 | Walker | |
| 2014/0125235 A1 | 5/2014 | van den Berg et al. | |
| 2014/0126261 A1 | 5/2014 | Newman, Jr. et al. | |
| 2014/0361696 A1 | 12/2014 | Siessegger et al. | |
| 2015/0264769 A1 | 9/2015 | Jelaca et al. | |

OTHER PUBLICATIONS 2014 iML Inc. (iNTEGRATED Memory Logic) Preliminary Specification iML8684, "Proprietary Technology Three Terminal Current Controller," 8684DOC rev 0.1, pp. 1-8.
2015 Maxic Technology Corporation, Data Sheet MT7605, "Segmented, Linear Constant—Current LED Driver," MT7605 Rev. 1.15, www.maxictech.com, pp. 1-7.
NXP GreenChip Objective Data Sheet, SSL6203TW, "120 V Mains Dimmable, 12 W Linear LED Driver," Rev. 1, Nov. 3, 2014, pp. 1-22.
Italian Search Report and Written Opinion for IT Appl. No. 102015000089452 dated Aug. 24, 2016 (8 pages).

* cited by examiner

ELECTRONIC CIRCUIT FOR DRIVING LED STRINGS INCLUDING A PLURALITY OF REGULATION MODULES WHICH FUNCTION IN SEQUENCE

CROSS REFERENCE TO RELATED APPLICATIONS

This application is a continuation application from U.S. Application for patent Ser. No. 15/162,289 filed May 23, 2016, which claims priority from Italian Application for Patent No. 102015000089452 filed Dec. 31, 2015, the disclosures of which are incorporated by reference.

TECHNICAL FIELD

The present invention relates to an electronic circuit for driving light emitting diode (LED) strings, which includes a plurality of regulation modules that function in sequence.

BACKGROUND

As is known, LED sources are increasingly widespread since they are characterized, among other things, by a high energy efficiency and a low power consumption given the same light yield.

LED sources require driving circuits capable of supplying low-voltage d.c. currents. For this reason, in the case where it is desired to supply an LED source through the electrical mains supply, it is necessary to use, within the driving circuit, a switching converter, such as for example a converter of a buck, boost, or flyback type.

The use of switching converters is particularly indicated in the case of professional applications, i.e., in the case of applications where the level of power required is relatively high (for example, higher than 50 W), and where the constraints regarding the package and installation are not stringent. Instead, in the case of applications, for example, in a domestic setting, the power required is low, and integration of switching converters in the driving circuits is problematic since the constructional constraints regarding the LED sources, for example as regards the corresponding plugs, are stringent.

As an alternative to the use of switching converters, less complex solutions have been proposed, also known as AC-LEDs. These solutions have some aspects in common, such as for example: the presence of a rectifier circuit; the presence of a plurality of LED strings, each string being formed by a corresponding number of LEDs connected in series; and the presence of one or more modules, which regulate the current that flows in the strings as a function of the value of the sinusoidal mains voltage. An example of driving circuit of an AC-LED type is described in United States Patent Application Publication No. 2013/0257282 (EP 2645816) (incorporated by reference).

In greater detail, typically a driving circuit of an AC-LED type is configured so that, as the sinusoidal mains voltage increases, the number of LED strings connected in series increases, and consequently also the number of LEDs turned on. Furthermore, as the number of LEDs turned on grows, the driving circuit increases the regulated current. More in particular, the increases in current occur according to discrete levels; the current thus remains constant for a certain time interval, before increasing to the next level. The number of current levels is equal to the number of LED strings.

This having been said, driving circuits of the so-called AC-LED type are effectively characterized by a high constructional simplicity; however, they provide only a fairly good performance in terms of power factor and harmonic distortion, on account of the stepwise currents generated by them.

There is a need in the art to provide an electronic driving circuit that will overcome at least in part the drawbacks of the prior art.

SUMMARY

In an embodiment, an electronic circuit for driving a plurality of LED strings connected in a cascade, each LED string including an anode terminal and a cathode terminal, comprises: a plurality of regulation modules, wherein each regulation module is configured to be electrically coupled, in use, to the cathode terminal of a corresponding LED string, and each regulation module further configured to be electrically coupled to receive a reference voltage in phase with a rectified mains voltage and having an amplitude smaller than an amplitude of said rectified mains voltage; and wherein said regulation modules are configured to execute in turn a current-regulation phase, with the current-regulation phases of said regulation modules occurring in sequence as a function of a trend of the reference voltage; and wherein each regulation module is configured so that, when said regulation module executes the current-regulation phase, current that flows in the corresponding LED string and in the previous LED strings is regulated so that it is proportional to the reference voltage.

In an embodiment, an electronic circuit is provided for driving a plurality of LED strings connected in series, each LED string including a respective anode terminal and a respective cathode terminal. The electronic circuit comprises: a plurality of regulation modules, wherein each regulation module is configured to be electrically coupled, in use, to the cathode terminal of a corresponding LED string; a reference circuit configured to receive a rectified mains voltage and to generate a reference voltage in phase with said rectified mains voltage and with an amplitude smaller than the amplitude of said rectified mains voltage, said reference voltage applied to each of said regulation modules; and wherein said regulation modules are configured to execute in turn and in sequence a current-regulation phase as a function of a trend of the reference voltage; and wherein each regulation module is configured during execution of said current-regulation phase to regulate a current flowing in the corresponding LED string as well as in previous LED strings in the series connection so that the regulated current is proportional to the reference voltage.

In an embodiment, an electronic circuit for driving a first LED string and a second LED string connected in series comprises: a first resistor; a first regulation circuit having a first input coupled to a cathode terminal of the first LED string and a first output coupled to the first resistor and a second output, said first regulation circuit including a first drive transistor coupled the first input of the first regulation circuit, a first control circuit configured to generate a first feedback voltage at the second output as a function of a voltage across the first resistor and a current flowing through the first drive transistor and a second control circuit configured to control the first drive transistor as a function of the first feedback voltage and a reference voltage; and a second regulation circuit having a first input coupled to a cathode terminal of the second LED string and a second input coupled to the second output of the first regulation circuit and a first output coupled to the first resistor, said second regulation circuit including a second drive transistor coupled the first input of the second regulation circuit, a third control circuit configured to generate a second feedback voltage as a function of the first feedback voltage and a current flowing through the second drive transistor and a fourth control circuit configured to control the second drive transistor as a function of the second feedback voltage and the reference voltage.

In an embodiment, an electronic circuit comprises: a first regulation module having a first controlled current path coupling a cathode terminal of a first LED string to ground through a first resistor and a first control circuit for controlling conduction of the first controlled current path, said first control circuit comprising: a current sensing circuit configured to sense current flowing in said first controlled current path and generate a first signal indicative of sensed current; an adder circuit configured to add said first signal to a second signal indicative a voltage drop across said first resistor, said adder circuit generating a first feedback signal; and an error amplifier configured to generate a control signal for controlling conduction of the first controlled current path as a function of a difference between the first feedback signal and a reference signal.

In an embodiment, an electronic circuit comprises: a resistor having a first terminal coupled to a node and a second terminal coupled to ground; a first regulation module having a first controlled current path coupling a cathode terminal of a first LED string to said node and a first control circuit for controlling conduction of the first controlled current path; and a second regulation module having a second controlled current path coupling a cathode terminal of a second LED string to said node and a second control circuit for controlling conduction of the second controlled current path.

In an embodiment, an electronic circuit comprises: a resistor having a first terminal coupled to a node and a second terminal coupled to ground; a first regulation module having a first controlled current path coupling a cathode terminal of a first LED string to said node and a first control circuit for controlling conduction of the first controlled current path in response to a first feedback voltage derived from a sum of a voltage drop across said resistor and a voltage drop across a first sense resistor coupled in series with the first controlled current path; and a second regulation module having a second controlled current path coupling a cathode terminal of a second LED string to said node and a second control circuit for controlling conduction of the second controlled current path in response to a second feedback voltage derived from a sum of the first feedback voltage and a voltage drop across a second sense resistor coupled in series with the second controlled current path.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION

Figure 1:
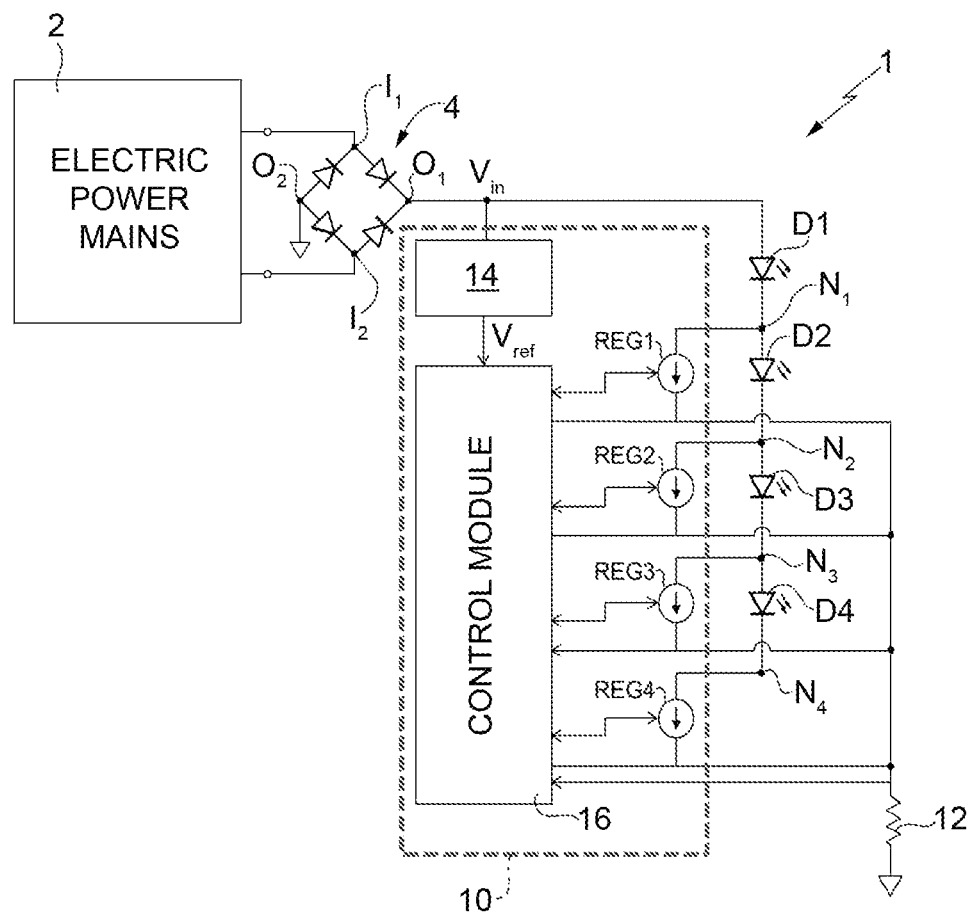
FIG. 1 shows a circuit diagram of an opto-electronic circuit including a driving circuit.

FIG. 1 shows an opto-electronic circuit 1 that may be electrically coupled to the electric power mains 2 through a rectifier 4, made up, for example, of a rectifier of the diode-bridge type, also known as Graetz-bridge rectifier. In this connection, the rectifier 4 comprises a first input terminal $I_1$ and a second input terminal $I_2$, which are respectively connected to the electric power mains 2, and a first output terminal $O_1$ and a second output terminal $O_2$. The second output terminal $O_2$ is connected to ground.

The opto-electronic circuit 1 further comprises a plurality of LED strings; purely by way of example, the embodiment illustrated in FIG. 1 comprises four LED strings, designated, respectively, by D1, D2, D3, and D4.

Each LED string is of a per se known type; consequently, even though not shown in detail, each of the first, second, third, and fourth LED strings D1, D2, D3, and D4 may comprise a respective number of LEDs, connected together in series.

In general, the first, second, third, and fourth LED strings D1, D2, D3, and D4 may be different from one another. Furthermore, each of the aforementioned LED strings forms a respective first terminal and a respective second terminal, referred to hereinafter as the anode terminal and the cathode terminal. In fact, each LED string is configured to be traversed by a current directed from the respective anode terminal to the respective cathode terminal only if the voltage present between the anode terminal and the cathode terminal exceeds a corresponding (positive) threshold voltage. In what follows the threshold voltages of the first, second, third, and fourth LED strings D1, D2, D3, D4 are referred to, respectively, as the first, second, third, and fourth threshold voltages $V_{th1}$, $V_{th2}$, $V_{th3}$, $V_{th4}$.

In greater detail, the anode terminal of the first LED string D1 is connected to the first output terminal $O_1$ of the rectifier 4. Furthermore, the first, second, third, and fourth LED strings D1, D2, D3, D4 are cascaded in series to one another. In fact, the cathode terminal of the first LED string D1 forms a first node $N_1$, connected to which is the anode terminal of the second LED string D2. The cathode terminal of the second LED string D2 forms a second node $N_2$, connected to which is the anode terminal of the third LED string D3. The cathode terminal of the third LED string D3 forms a third node $N_3$, connected to which is the anode terminal of the fourth LED string D4. The cathode terminal of the fourth LED string D4 forms a fourth node $N_4$.

The opto-electronic circuit 1 further comprises an electronic driving circuit 10 and a resistor 12, referred to hereinafter as the external resistor 12. The external resistor 12 has a resistance $R_{rext}$, which is for example equal to 30Ω.

Figure 2:
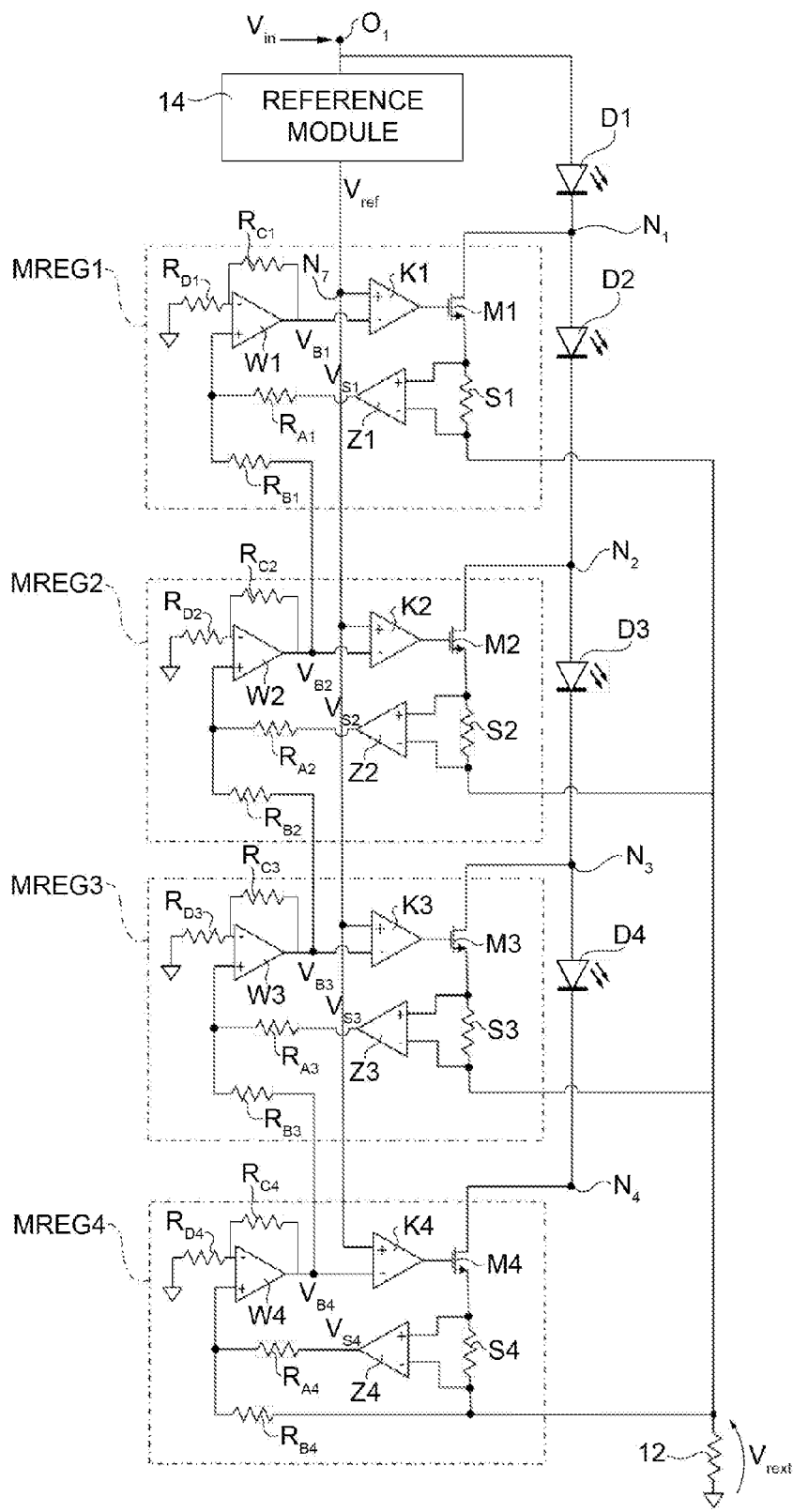
FIG. 2 shows a circuit diagram of an embodiment of the driving circuit.

In FIG. 1, the electronic driving circuit 10 is represented by a corresponding principle block diagram, instead of by the corresponding circuit diagram, which is shown in FIG. 2, to which the reader is referred for the details of implementation. This having been said, the electronic driving circuit 10 comprises a module for generating an electrical reference quantity, referred to hereinafter as the reference generator 14. Further, the electronic driving circuit 10 comprises a control module 16 and a first regulator REG1, a second regulator REG2, a third regulator REG3, and a fourth regulator REG4, which are controlled by the control module 16 and supply to the latter quantities indicating currents regulated by them. Furthermore, each of the first, second, third, and fourth regulators REG1, REG2, REG3, REG4 has a respective first terminal and a respective second terminal. The first terminals of the first, second, third, and fourth regulators REG1, REG2, REG3, REG4 are connected respectively to the first, second, third, and fourth nodes $N_1$, $N_2$, $N_3$, $N_4$, whereas the respective second terminals are connected to a first terminal of the external resistor 12, the second terminal of which is connected to ground. In addition, as illustrated qualitatively in FIG. 1, the first input terminal of the external resistor 12 is connected to the control module 16 for enabling a feedback control, as described hereinafter.

Figure 3:
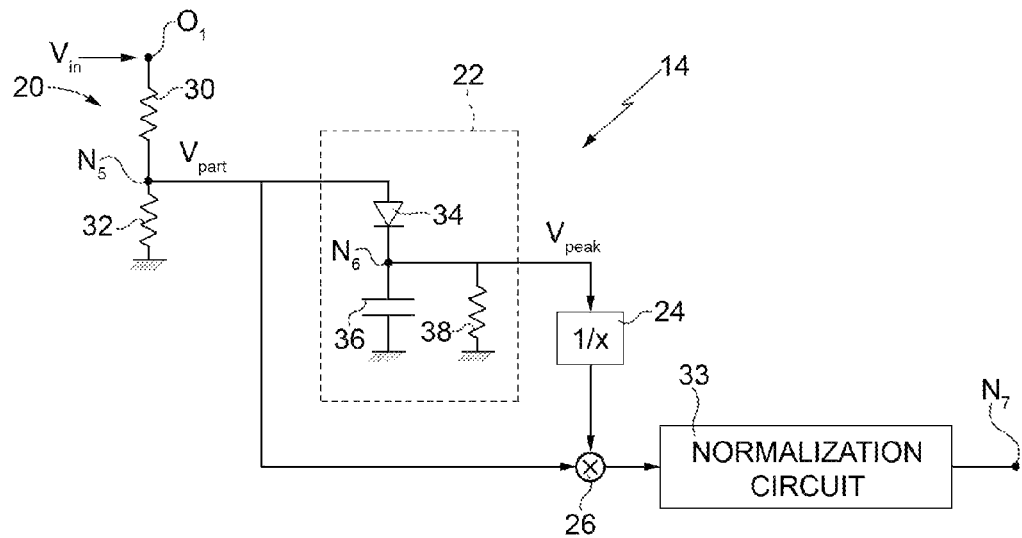
FIG. 3 shows a circuit diagram of a circuit designed to generate a reference voltage.

As illustrated in greater detail in FIG. 3, the reference generator 14 comprises a voltage divider 20, a peak detector 22, a divider 24, a multiplier 26, and a normalization circuit 33.

The voltage divider 20 comprises a pair of resistors 30, 32, referred to hereinafter as the first and second division resistors 30, 32. The first terminal of the first division resistor 30 is connected to the first output terminal $O_1$ of the rectifier 4, whereas the second terminal of the first division resistor 30 is connected to the first terminal of the second division resistor 32, with which it forms a fifth node $N_5$. The second terminal of the second division resistor 32 is connected to ground.

The peak detector 22 comprises a diode 34, the anode of which is connected to the fifth node $N_5$, and the cathode of which forms a sixth node $N_6$. The peak detector 22 further comprises a capacitor 36 and a resistor 38, referred to hereinafter as the output resistor 38. The capacitor 36 and the output resistor 38 are connected in parallel between the sixth node $N_6$ and ground. In practice, the anode of the diode 34 and the sixth node $N_6$ form the input and the output of the peak detector 22, respectively.

The divider 24 is formed by an electronic circuit of a per se known type (not described in detail), which is designed to generate, on its own output, a voltage signal equal to $1/x$, where x is a voltage signal present on its own input, as described in greater detail hereinafter. The input of the divider 24 is connected to the output of the peak detector 22.

The multiplier 26 is formed by a corresponding electronic circuit of a per se known type (not described in detail), which includes a first input and a second input and is apt to generate on its own output a voltage signal equal to the product of the voltage signals present on its own first and second inputs. For instance, even though not illustrated, the multiplier 26 may be formed by a so-called Gilbert multiplier. In this case, it is possible for the divider 24 and the multiplier 26 to be implemented with a single circuit scheme. Furthermore, the first and second inputs of the multiplier 26 are connected to the fifth node $N_5$ and to the output of the divider 24, respectively. The output of the multiplier 26 is connected to the input of the normalization circuit 33, the output of which forms a seventh node $N_7$. In turn, the seventh node $N_7$ forms the output of the reference generator 14.

Figure 4:
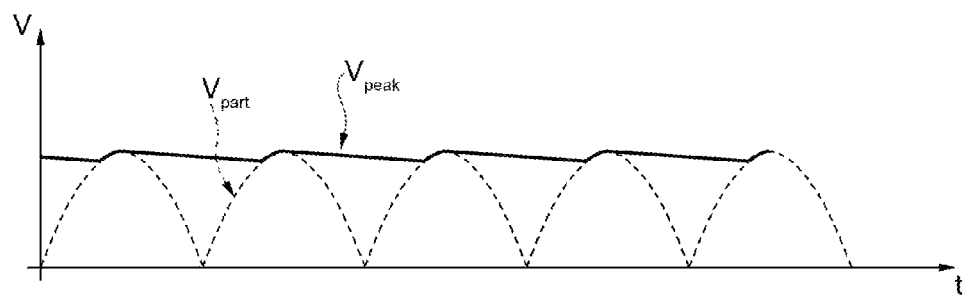
FIG. 4 shows examples of time plots of signals generated in the circuit illustrated in FIG. 3.

In use, present on the first output terminal $O_1$ of the rectifier 4, and thus at input to the reference generator 14, is a voltage $V_{in}$, which is formed by a rectified double-half-wave sinusoidal voltage, and is in phase with the voltage supplied by the electric power mains 2. Thus, present on the fifth node $N_5$ is a voltage $V_{part}$, which is equal to $k \cdot V_{in}$, where k is the division ratio introduced by the voltage divider 20, which may, for example, be equal to 0.0067. Furthermore, present on the sixth node $N_6$, and thus at output from the peak detector 22, is a voltage $V_{peak}$, which is a rectified voltage and has a plot of the type represented in FIG. 4. For reasons of simplicity, for the purposes of the present description, it is assumed that the voltage $V_{peak}$ is constant and equal to the peak value of the voltage $V_{part}$.

The divider 24 generates a voltage equal to $1/V_{peak}$, whereas present at output from the multiplier 26 is a voltage equal to $V_{part}/V_{peak}$. Furthermore, the normalization circuit 33 is of a per se known type and is configured to supply on its own output, i.e., on the seventh node $N_7$, a voltage $V_{ref} = V_{part}/V_{peak} \cdot V_{nomin}$, referred to hereinafter as the reference voltage $V_{ref}$. In greater detail, $V_{nomin}$ is for example equal to 2.1 V.

In practice, the reference voltage $V_{ref}$, supplied by the reference generator 14, has the shape of a rectified double-half-wave sinusoid, in phase with the voltage $V_{in}$ and with an amplitude normalized with respect to the peak value assumed by the voltage $V_{in}$ so that, when the voltage $V_{in}$ has a maximum, the reference voltage $V_{ref}$ is equal to $V_{nomin}$. Consequently, the amplitude of the reference voltage $V_{ref}$ is substantially independent of possible variations of amplitude of the voltage $V_{in}$, the latter being caused, for example, by fluctuations of the voltage supplied by the electric power mains 2. Consequently, the amplitude of the reference voltage $V_{ref}$ is independent of the effective peak value of the voltage $V_{in}$. For reasons of simplicity, in what follows there is assumed, except where otherwise specified, operation in nominal conditions, i.e., in the presence of an ideal electric power mains supply. In these conditions, it may be assumed that $V_{ref} = k \cdot V_{in}$.

Once again with reference to the electronic driving circuit 10, it comprises a plurality of regulation modules, as illustrated in detail in FIG. 2. In particular, in the embodiment illustrated in FIG. 2 there are present a first regulation module MREG1, a second regulation module MREG2, a third regulation module MREG3, and a fourth regulation module MREG4, electrically connected together in sequence, as described hereinafter.

In detail, the first regulation module MREG1 comprises a first operational amplifier and a second operational amplifier, designated, respectively, by K1 and W1, as well as a MOSFET M1, and a resistor S1, referred to hereinafter as the sensing resistor S1. For instance, the MOSFET M1 is of the N-channel-enrichment type.

In greater detail, the drain terminal of the MOSFET M1 is connected to the first node $N_1$, whereas the source terminal is connected to the first terminal of the sensing resistor S1, the second terminal of which is connected to the first terminal of the external resistor 12, the second terminal of which, as mentioned previously, is connected to ground.

The gate terminal of the MOSFET M1 is connected to the output terminal of the first operational amplifier K1. The MOSFET M1 is thus driven by the first operational amplifier K1. The positive input terminal of the first operational amplifier K1 is connected to the seventh node $N_7$, i.e., to the output of the reference generator 14, to be set, in use, at the reference voltage $V_{ref}$. The negative input terminal of the first operational amplifier K1 is connected to the output terminal of the second operational amplifier W1, which in use generates a voltage $V_{B1}$, referred to hereinafter as the feedback voltage $V_{B1}$.

The first regulation module MREG1 further comprises another four resistors, referred to hereinafter as the first, second, third, and fourth adder resistors $R_{A1}$, $R_{B1}$, $R_{C1}$, $R_{D1}$; further, the first regulation module MREG1 comprises a differential amplifier Z1.

In greater detail, the differential amplifier Z1 is of a per se known type and comprises a respective positive input terminal and a respective negative input terminal, which are connected, respectively, to the first and second terminals of the sensing resistor S1. In use, the differential amplifier Z1 generates on its own output a voltage $V_{S1}$, referred to hereinafter as the sensed voltage $V_{S1}$. The sensed voltage $V_{S1}$ is directly proportional to the current that flows in the sensing resistor S1, and thus to the current that flows in the MOSFET M1.

Figure 5:
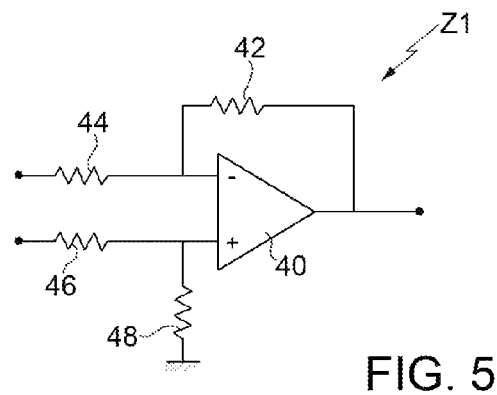
FIG. 5 shows a circuit diagram of a differential amplifier.

Purely by way of example, the differential amplifier Z1 may be formed as illustrated in FIG. 5. In this case, the differential amplifier Z1 comprises a respective operational amplifier 40 and four corresponding resistors, referred to hereinafter as the first, second, third, and fourth additional resistors 42, 44, 46, 48. The first additional resistor 42 is connected between the output terminal and the negative input terminal of the operational amplifier 40. The second additional resistor 44 has a first terminal connected to the negative input terminal of the operational amplifier 40, whereas the respective second terminal forms the negative input terminal of the differential amplifier Z1, and thus is connected to the second terminal of the sensing resistor S1. The third additional resistor 46 has a first terminal connected to the positive input terminal of the operational amplifier 40, whereas the respective second terminal forms the positive input terminal of the differential amplifier Z1, and is thus connected to the first terminal of the sensing resistor S1. The fourth additional resistor 48 is connected between the positive input terminal of the operational amplifier 40 and ground. By selecting in a per se known manner the values of resistance of the first, second, third, and fourth additional resistors 42, 44, 46, 48, it is thus possible to set the gain between the voltage across the input terminals of the differential amplifier Z1 and the sensed voltage $V_{S1}$, generated on the output terminal of the differential amplifier Z1. Ideally, the differential amplifier Z1 has an infinite common-mode rejection ratio (CMRR).

Once again with reference to FIG. 2, the second operational amplifier W1 forms an adder circuit, together with the first, second, third, and fourth adder resistors $R_{A1}$, $R_{B1}$, $R_{C1}$, $R_{D1}$. In particular, the third adder resistor $R_{C1}$ is connected between the negative input terminal and the output terminal of the second operational amplifier W1. The fourth adder resistor $R_{D1}$ is connected between the negative input terminal of the second operational amplifier W1 and ground. The first and second terminals of the first adder resistor $R_{A1}$ are respectively connected to the positive input terminal of the second operational amplifier W1 and to the output terminal of the differential amplifier Z1. The first terminal of the second adder resistor $R_{B1}$ is connected to the positive input terminal of the second operational amplifier W1, whereas the second terminal of the second adder resistor $R_{B1}$ is connected to the second regulation module MREG2, as described hereinafter.

In practice, the aforementioned adder circuit and the first operational amplifier K1 form, respectively, a first control circuit and a second control circuit of a control stage designed to control the MOSFET M1.

From a qualitative standpoint, the MOSFET M1, the sensing resistor S1, and the first operational amplifier K1 perform the function of the first regulator REG1. Furthermore, once again at a qualitative level, the differential amplifier Z1 and the adder circuit formed by the second operational amplifier W1 perform part of the functions of the control module 16.

The second, third, and fourth regulation modules MREG2, MREG3, MREG4 are the same as the first regulation module MREG, but for the differences described hereinafter. Furthermore, given any one of the second, third, and fourth regulation modules MREG2, MREG3, MREG4, the respective electronic components and the voltages generated are designated by the same terms used for the corresponding electronic components/voltages of the first regulation module MREG1, as well as by the same references, but for the fact that, given a component or any voltage of the n-th regulation module, the corresponding reference sign terminates with the number 'n', instead of with the number '1'. For this reason, the MOSFET, the first and second operational amplifiers, the differential amplifier, the sensing resistor, the feedback voltage, the sensed voltage, and the first, second, third, and fourth adder resistors of the second regulation module MREG2 are designated, respectively, by M2, K2, W2, Z2, S2, $V_{B2}$, $V_{S2}$, $R_{A2}$, $R_{B2}$, $R_{C2}$, $R_{D2}$; likewise, the corresponding components/voltages of the third regulation module MREG3 are designated, respectively, by M3, K3, W3, Z3, S3, $V_{B3}$, $V_{S3}$, $R_{A3}$, $R_{B3}$, $R_{C3}$, $R_{D3}$; finally, the corresponding components/voltages of the fourth regulation module MREG4 are designated, respectively, by M4, K4, W4, Z4, S4, $V_{B4}$, $V_{S4}$, $R_{A4}$, $R_{B4}$, $R_{C4}$, $R_{D4}$.

Once again with reference to the first regulation module MREG1, the aforementioned second terminal of the second adder resistor $R_{B1}$ is connected to the output terminal of the second operational amplifier W2 of the second regulation module MREG2 for receiving the feedback voltage $V_{B2}$ generated by the latter. In addition, the resistance of the first adder resistor $R_{A1}$ is greater than the resistance of the second adder resistor $R_{B1}$ so that we have $V_{B1} = g1 \cdot V_{S1} + g2 \cdot V_{B2}$, with $g2 > g1$, for reason that will be clarified hereinafter.

Once again with reference to the first regulation module MREG1, the sensing resistor S1 has a resistance lower than the resistance $R_{ext}$ of the external resistor 12. For example, the resistance of the sensing resistor S1 may be equal to one thirtieth of the resistance $R_{ext}$.

Purely by way of example, the sensing resistor S1 may have a resistance, for example, equal to 1Ω. The first and second adder resistors $R_{A1}$, $R_{B1}$ may have resistances, for example, equal to 10 kΩ and 9.8 kΩ, respectively; further, the third and fourth adder resistors $R_{C1}$, $R_{D1}$ may have resistances equal to 10 kΩ. In this case, to a first approximation, g1=1 and g2=1.01. More in general, the gains g2 and g1 may be close to unity; for example, the relations g1=1 and g2=1+Δ, with Δ comprised for example between 0.01 and 0.1, may apply. In addition, the differential amplifier Z1 may be configured to amplify the voltage drop on the sensing resistor S1 with a gain equal to unity. In this case, it is for example possible for the first, second, third, and fourth additional resistors 42, 44, 46, 48 to be the same as one another and equal, for example, to 10 kΩ Once again purely by way of example, the first, second, third, and fourth threshold voltages $V_{th1}$, $V_{th2}$, $V_{th3}$, $V_{th4}$ may be equal approximately to 110 V, 78 V, 60 V, and 40 V, respectively.

As regards the second regulation module MREG2, the drain terminal of the respective MOSFET M2 is connected to the second node $N_2$. Furthermore, the second terminal of the second adder resistor $R_{B2}$ is connected to the output terminal of the second operational amplifier W3 of the third regulation module MREG3 for receiving the feedback voltage $V_{B3}$ generated by the latter.

As regards the third regulation module MREG3, the drain terminal of the respective MOSFET M3 is connected to the third node $N_3$. Furthermore, the second terminal of the second adder resistor $R_{B3}$ is connected to the output terminal of the second operational amplifier W4 of the fourth regulation module MREG4 for receiving the feedback voltage $V_{B4}$ generated by the latter.

As regards the fourth regulation module MREG4, the drain terminal of the respective MOSFET M4 is connected to the fourth node $N_4$. Furthermore, the second terminal of the second adder resistor $R_{B4}$ is connected to the second terminal of an own sensing resistor S4, and thus to the first terminal of the external resistor 12, on which in use there is a voltage drop $V_{rext}$.

In practice, the positive input terminals of the first operational amplifiers K1, K2, K3, K4 of the first, second, third, and fourth regulation modules MREG1, MREG2, MREG3 and MREG4 are connected to the output of the reference generator 14 and receive the reference voltage $V_{ref}$. Instead, the negative input terminals of the first operational amplifiers K1, K2, K3, K4 receive the corresponding feedback voltages $V_{B1}$, $V_{B2}$, $V_{B3}$, $V_{B4}$, which are a function, among other things, of the corresponding sensed voltages $V_{S1}$, $V_{S2}$, $V_{S3}$, $V_{S4}$. Furthermore, as regards any one of the first, second, and third regulation modules MREG1, MREG2, MREG3, the corresponding feedback voltage is likewise a function of the feedback voltage generated by the next regulation module. In particular, the feedback voltages $V_{B1}$, $V_{B2}$, $V_{B3}$ are respectively a function of the feedback voltages $V_{B2}$, $V_{B3}$, $V_{B4}$. As regards the fourth regulation module MREG4, the feedback voltage $V_{B4}$ is a function, not only of the respective sensed voltage $V_{S4}$, but also of the voltage $V_{rext}$ drop on the external resistor 12. On the other hand, since, as explained previously, the feedback voltages $V_{B1}$, $V_{B2}$, $V_{B3}$ are respectively a function of the feedback voltages $V_{B2}$, $V_{B3}$, $V_{B4}$, also the feedback voltages $V_{B1}$, $V_{B2}$, $V_{B3}$ depend upon the voltage $V_{rext}$ drop on the external resistor 12.

Operation of the electronic driving circuit 10 is now described with reference to FIG. 6.

In detail, it is assumed that at a first instant $t_1$ the reference voltage $V_{ref}$ is zero and that subsequently there follows an ascending portion of the respective profile of rectified double-half-wave sinusoid.

At the first instant $t_1$, current may not flow in any of the LED strings. Consequently, the voltage $V_{rext}$ on the external resistor 12, the sensed voltages $V_{S1}$, $V_{S2}$, $V_{S3}$, $V_{S4}$, and the feedback voltages $V_{B1}$, $V_{B2}$, $V_{B3}$, $V_{B4}$ are zero. Consequently, each of the first operational amplifiers K1, K2, K3, K4 of the first, second, third, and fourth regulation modules MREG1, MREG2, MREG3, MREG4 is in positive saturation, since the voltage on the respective positive input terminal (equal to the reference voltage $V_{ref}$) exceeds the voltage (zero) present on the respective negative input terminal.

Figure 6:
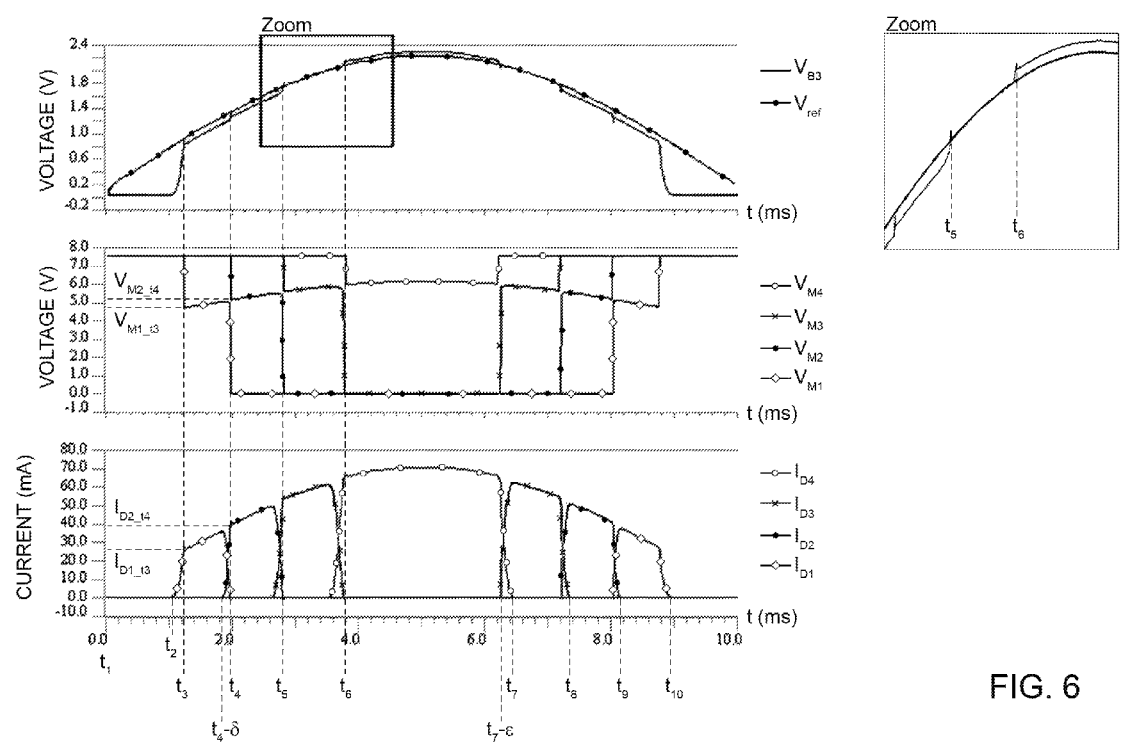
FIG. 6 shows time plots of voltages and currents generated in an embodiment of the electronic driving circuit.

In other words, designating by $V_{M1}$, $V_{M2}$, $V_{M3}$, $V_{M4}$ the voltages (illustrated in FIG. 6) present, respectively, on the output terminals of the first operational amplifiers K1, K2, K3, K4 of the first, second, third, and fourth regulation modules MREG1, MREG2, MREG3, MREG4, at the first instant $t_1$ these voltages are equal to a maximum value (which, in the example illustrated in FIG. 6, is approximately equal to 7.5 V). Consequently, the MOSFETs M1, M2, M3, M4 of the first, second, third, and fourth regulation modules MREG1, MREG2, MREG3, MREG4 operate in the saturation region and may be equated to corresponding short-circuits.

Next, the increase in the voltage $V_{in}$ brings the latter to approximate the first threshold voltage $V_{th1}$ of the first LED string D1. Consequently, at a subsequent second instant $t_2$, a current starts to flow in the first LED string D1, but not in the other LED strings. In particular, at the second instant $t_2$ the voltage $V_{in}$ exceeds the first threshold voltage $V_{th1}$.

In practice, designating respectively by $I_{D1}$, $I_{D2}$, $I_{D3}$, $I_{D4}$ the currents (illustrated in FIG. 6) that flow in the MOSFETs M1, M2, M3, M4 of the first, second, third, and fourth regulation modules MREG1, MREG2, MREG3, MREG4, starting from the second instant $t_2$ there is an increase of just the current $I_{D1}$, which, as has been said, flows, apart from the sensing resistor S1 of the first regulation module MREG1 and the external resistor 12, in just the first LED string D1. The other currents $I_{D2}$, $I_{D3}$, $I_{D4}$ remain zero.

Once a brief transient caused by the presence of the series resistances of the LEDs of the first LED string D1 vanishes, and more precisely starting from a third instant $t_3$, the first regulation module MREG1 operates in the regulation phase. The regulation phase entails the fact that the first operational amplifier K1 and the MOSFET M1 of the first regulation module MREG1 have exited from the respective saturation states, and that the MOSFET M1 operates in a linear region and causes a current proportional to the reference voltage $V_{ref}$ to flow in the first LED string D1.

In greater detail, after the third instant $t_3$, the first regulation module MREG1 operates so that the first operational amplifier K1 keeps the voltage between its own positive input terminal (present on which is the reference voltage $V_{ref}$) and its own negative input terminal (present on which is the feedback voltage $V_{B1}$) at zero. More in particular, the first operational amplifier K1, the differential amplifier Z1, the sensing resistor S1, the MOSFET M1, and the adder circuit, including the second operational amplifier W1, form a closed control loop, where the first operational amplifier K1 operates outside saturation, for regulating the current $I_{D1}$ linearly.

In even greater detail, since g1≈1 and g2≈1 and the sensing resistor S1 has a resistance that to a first approximation is negligible with respect to the resistance $R_{ext}$ of the external resistor 12, at the third instant $t_3$ the current $I_{D1}$ is substantially equal to the ratio between the voltage $V_{rext}$ and the resistance $R_{rext}$ of the external resistor 12. Furthermore, since at the third instant $t_3$ the voltage $V_{rext}$ is approximately equal (in the aforementioned nominal conditions) to $k \cdot V_{th1}$, where k is the aforementioned division ratio introduced by the voltage divider 20, the current $I_{D1}$ assumes a value $I_{D1\_t3} = k \cdot V_{th1}/R_{rext}$. For instance, with k=0.0067, $V_{th1}$=110 V, and $R_{ext}$=30Ω, we have that $I_{D1\_t3}$ is approximately equal to 25 mA. In this connection, the curves shown in FIG. 6 are purely an example and refer to a hypothetical case, where, in fact, $I_{D1\_t3}$ is approximately equal to 25 mA.

Once again with reference to the third instant $t_3$, the currents in the second, third, and fourth LED strings D2, D3, D4 are zero because the voltage $V_{in}$ has not yet exceeded the sum of the first and second threshold voltages $V_{th1}$, $V_{th2}$, nor much less has it exceeded the sum of the first, second, and third threshold voltages $V_{th1}$, $V_{th2}$, $V_{th3}$ or the sum of the first, second, third, and fourth threshold voltages $V_{th1}$, $V_{th2}$, $V_{th3}$, $V_{th4}$.

In greater detail, before the third instant $t_3$, the current $I_{D1}$ exhibits a peak, due to the fact that, as explained previously, the MOSFET M1 is in saturation before the first regulation module MREG1 enters the regulation phase. Furthermore, before the regulation module MREG1 closes the aforementioned control loop, a time interval, albeit of very limited duration, elapses. In what follows, this peak, as likewise the peaks that appear before entry into the regulation phase of the second, third, and fourth regulation modules MREG2, MREG3, MREG4, are not described any further in so far as they are irrelevant for the purposes of operation of the electronic driving circuit 10.

This having been said, when the first regulation module MREG1 operates in the regulation phase, the current $I_{D1}$ follows a corresponding sinusoidal profile, as the voltage $V_{in}$ increases. There is thus a linear regulation of the current $I_{D1}$. In particular, the current $I_{D1}$ is substantially equal to $V_{ref}/R_{rext}$. Likewise, also the voltage $V_{M1}$ follows a corresponding sinusoidal profile. In particular, at the third instant $t_3$, the voltage $V_{M1}$ decreases to a corresponding value $V_{M1\_t3}$, which depends upon the electrical characteristics of the aforementioned control loop, and subsequently follows a respective sinusoidal profile.

In addition, when the first regulation module MREG1 operates in the regulation phase, the first operational amplifiers of the regulation modules downstream of the first regulation module MREG1, i.e., the first operational amplifiers K2, K3, K4 of the second, third, and fourth regulation modules MREG2, MREG3, MREG4 remain in saturation, as likewise the corresponding MOSFETs.

Next, as the voltage $V_{in}$ increases, in a subsequent fourth instant $t_4$ the second regulation module MREG2 enters the regulation phase.

In greater detail, at an instant $t_4-\delta$ (with $t_3 < t_4-\delta < t_4$) the voltage $V_{in}$ is found to exceed the sum of the first and second threshold voltages $V_{th1}$, $V_{th2}$, and consequently the current $I_{D2}$ starts to increase. Furthermore, following upon the fourth instant $t_4$, the first operational amplifier K2 and the MOSFET M2 of the second regulation module MREG2 form a closed control loop that regulates the current $I_{D2}$. In particular, the MOSFET M2 of the second regulation module MREG2 operates in a linear region and causes a current proportional to the reference voltage $V_{ref}$ to flow in the second LED string D2. Further, the first operational amplifier K2 keeps at zero the voltage between its own positive input terminal (present on which is the reference voltage $V_{ref}$) and its own negative input terminal (present on which is the feedback voltage $V_{B2}$).

In greater detail, at the fourth instant $t_4$, the current $I_{D2}$ assumes, to a first approximation (in the aforementioned nominal conditions), a value $I_{D2\_t4} = k \cdot (V_{th1} + V_{th2})/R_{rext}$. For instance, with $k=0.0067$, $V_{th1}=110$ V, $V_{th2}=78$ V and $R_{ext}=30\Omega$, we have $I_{D2\_t4}$ approximately equal to 42 mA.

Entry into the regulation phase by the second regulation module MREG2 entails turning-off of the first regulation module MREG1; i.e., it entails opening of the control loop formed by the first regulation module MREG1. In practice, at the fourth instant $t_4$, the first operational amplifier K1 enters negative saturation since the voltage on the respective positive input terminal (equal to the reference voltage $V_{ref}$) becomes lower than the voltage present on the respective negative input terminal, for the reasons described hereinafter. In particular, assuming that the first operational amplifiers K1, K2, K3, K4 are of a unipolar type, the voltage $V_{M1}$ generated on the output of the first operational amplifier K1 becomes zero. Consequently, the MOSFET M1 of the first regulation module MREG1 is inhibited and operates as an open circuit. For this reason, following upon the fourth instant $t_4$, the current $I_{D2}$ flows in the first and second LED strings D1, D2, as well as in the MOSFET M2 and in the sensing resistor S2 of the second regulation module MREG2, but not in the MOSFET M1 and in the sensing resistor S1 of the first regulation module MREG1.

As regards the aforementioned turning-off of the first regulation module MREG1, this occurs given that g2>g1, and thus given that, in generating the feedback voltage $V_{B1}$, a greater weight is assigned to the feedback voltage $V_{B2}$ (and consequently to the sensed voltage $V_{S2}$ of the second regulation module MREG2) than to the sensed voltage $V_{S1}$ of the first regulation module MREG1. In other words, a gain is applied to the feedback voltage $V_{B2}$, and thus to the sensed voltage $V_{S2}$ of the second regulation module MREG2, that causes an unbalancing of the voltages present on the input terminals of the first operational amplifier K1 of the first regulation module MREG1. In particular, on the positive input terminal of the first operational amplifier K1 of the first regulation module MREG1 there is still present the reference voltage $V_{ref}$, but the feedback voltage $V_{B1}$, present on the negative input terminal, becomes higher than the reference voltage $V_{ref}$.

In greater detail, as mentioned previously, the current $I_{D2}$, which is initially zero, starts to increase at the instant $t_4-\delta$. Simultaneously, the current $I_{D1}$ starts to decrease with respect to the corresponding sinusoidal profile until it vanishes at the fourth instant $t_4$, since the feedback voltage $V_{B1}$ of the first regulation module MREG1 also depends upon the sensed voltage $V_{S2}$ of the second regulation module MREG2.

In practice, in a time interval that has a duration equal to $\delta$ and terminates at the fourth instant $t_4$, there is a passage of current in both of the MOSFETs M1, M2 of the first and second regulation modules MREG1, MREG2, so that the passage between the phase where regulation is made by the first regulation module MREG1 and the phase where regulation is made by the second regulation module MREG2 occurs without any sharp discontinuity. In particular, in the aforementioned time interval, the first regulation module MREG1 is not yet turned off (it is outside saturation), but no longer regulates the current $I_{D1}$ so that it is proportional to the reference voltage $V_{ref}$. Equivalently, in the aforementioned time interval regulation of the current that as a whole flows in the cascade of the LED strings is entrusted to the co-operation between the first and second regulation modules MREG1, MREG2. More in particular, in the aforementioned time interval, it is the sum of the currents $I_{D1}$ and $I_{D2}$ that is proportional to the reference voltage $V_{ref}$.

This having been said, when the second regulation module MREG2 operates in the regulation phase, the current $I_{D2}$ and the voltage $V_{M2}$ follow corresponding sinusoidal profiles; in particular, the current $I_{D2}$ is substantially equal to $V_{ref}/R_{rext}$. In addition, at the fourth instant $t_4$, the voltage $V_{M2}$ decreases from the aforementioned maximum value to a corresponding value $V_{M2\_t4}$. In addition, when the second regulation module MREG2 operates in the regulation phase, the first operational amplifiers K3, K4 of the third and fourth regulation modules MREG3, MREG4 remain in saturation, as likewise the corresponding MOSFETs.

Following upon the further increase in the voltage $V_{in}$, at a fifth instant $t_5$ there occurs turning-off of the second regulation module MREG2 and entry in the regulation phase by the third regulation module MREG3. The first regulation module MREG1 remains turned off. The fifth instant $t_5$ is subsequent to overstepping, by the voltage $V_{in}$, of the sum of the first, second, and third threshold voltages $V_{th1}$, $V_{th2}$, $V_{th3}$.

Following upon the further increase in the voltage $V_{in}$, at a sixth instant $t_6$ there occurs turning-off of the third regulation module MREG3 and entry into the regulation phase by the fourth regulation module MREG4. The first and second regulation modules MREG1, MREG2 remain turned off. The sixth instant $t_5$ is subsequent to overstepping, by the voltage $V_{in}$, of the sum of the first, second, third, and fourth threshold voltages $V_{th1}$, $V_{th2}$, $V_{th3}$, $V_{th4}$.

Once again with reference to FIG. 6, it shows, purely by way of example, also the plot of the reference voltage $V_{ref}$ and of the feedback voltage $V_{B3}$ of the third regulation module MREG3. In practice, it may be noted how the feedback voltage $V_{B3}$ is lower than the reference voltage $V_{ref}$ up to the fifth instant $t_5$, with consequent positive saturation of the first operational amplifier K3 of the third regulation module MREG3. Between the fifth and sixth instants $t_5$, $t_6$, the feedback voltage $V_{B3}$ is equal to the reference voltage $V_{ref}$ since at the fifth instant $t_5$ the third regulation module MREG3 has entered the regulation phase. At the sixth instant $t_6$, the feedback voltage $V_{B3}$ exceeds the reference voltage $V_{ref}$, and thus the third regulation module MREG3 turns off.

Following upon the sixth instant $t_6$, the voltage $V_{in}$ assumes a respective maximum value and then starts to decrease. In particular, at a seventh instant $t_7$, the voltage $V_{in}$ becomes lower than the sum of the first, second, third, and fourth threshold voltages $V_{th1}$, $V_{th2}$, $V_{th3}$, $V_{th4}$. Consequently, the current $I_{D4}$ vanishes.

In detail, the current $I_{D4}$ tends to decrease before the seventh instant $t_7$ on account of the presence of the series resistances of the LEDs of the LED strings. This means that, at an instant $t_7-\epsilon$, the fourth control module MREG4 exits from the regulation phase.

In greater detail, at the instant $t_7-\epsilon$, the reference voltage $V_{ref}$ present on the positive input terminal of the first operational amplifier K4 becomes higher than the feedback voltage $V_{B4}$ present on the negative input terminal. Consequently, the first operational amplifier K4 of the fourth regulation module MREG4 is positively saturated. At the same time, the current $I_{D3}$ starts to increase. Furthermore, since the contribution of the third regulation module MREG3 to the feedback voltage $V_{B3}$ due to the sensed voltage $V_{s4}$ of the fourth regulation module MREG4 has vanished, the feedback voltage $V_{B3}$ equals the reference voltage $V_{ref}$. Consequently, at the seventh instant $t_7$, the third regulation module MREG3 returns into the regulation phase.

At a subsequent eighth instant $t_8$, the voltage $V_{in}$ becomes lower than the sum of the first, second, and third threshold voltages $V_{th1}$, $V_{th2}$, $V_{th3}$. Consequently, the current $I_{D3}$ vanishes. Before the current $I_{D3}$ vanishes, the first operational amplifier K3 of the third regulation module MREG3 is positively saturated. Furthermore, at the eighth instant $t_8$, the second regulation module MREG2 returns into the regulation phase.

Likewise, at a ninth instant $t_9$ the voltage $V_{in}$ becomes lower than the sum of the first and second threshold voltages $V_{th1}$, $V_{th2}$. Consequently, the current $I_{D2}$ vanishes. Before the current $I_{D2}$ vanishes, the first operational amplifier K2 of the second regulation module MREG2 is positively saturated. In addition, at the ninth instant $t_9$, the first regulation module MREG1 returns into the regulation phase.

Finally, at a tenth instant $t_{10}$, the voltage $V_{in}$ becomes lower than the first threshold voltage $V_{th1}$. Consequently, the current $I_{D1}$ vanishes. Before the current $I_{D1}$ vanishes, the first operational amplifier K1 of the first regulation module MREG1 is positively saturated, and thus the first regulation module MREG1 exits from the regulation phase.

In practice, the present electronic driving circuit comprises a plurality of regulation modules connected electrically in sequence, each of which is electrically coupled to the cathode terminal of a corresponding LED string. The regulation modules are configured to execute in turn a current-regulation phase. Furthermore, the current-regulation phases occur in a predetermined sequence, as a function of the trend of reference voltage $V_{ref}$. In particular, when the amplitude of the reference voltage $V_{ref}$ is increasing, the first, second, third, and fourth regulation modules MREG1, MREG2, MREG3, MREG4 execute the respective regulation phases in succession, i.e., in a first order. Instead, when the amplitude of the reference voltage $V_{ref}$ is decreasing, the first, second, third, and fourth regulation modules MREG1, MREG2, MREG3, MREG4 execute the respective regulation phases in a second order, reversed with respect to the first order. In addition, each regulation module is such that, when it operates in the current-regulation phase, it regulates the current that flows in the corresponding LED string and in the previous LED strings so that this current is proportional to the reference voltage $V_{ref}$.

From what has been described and illustrated so far, the advantages that the present solution affords emerge clearly.

Figure 7:
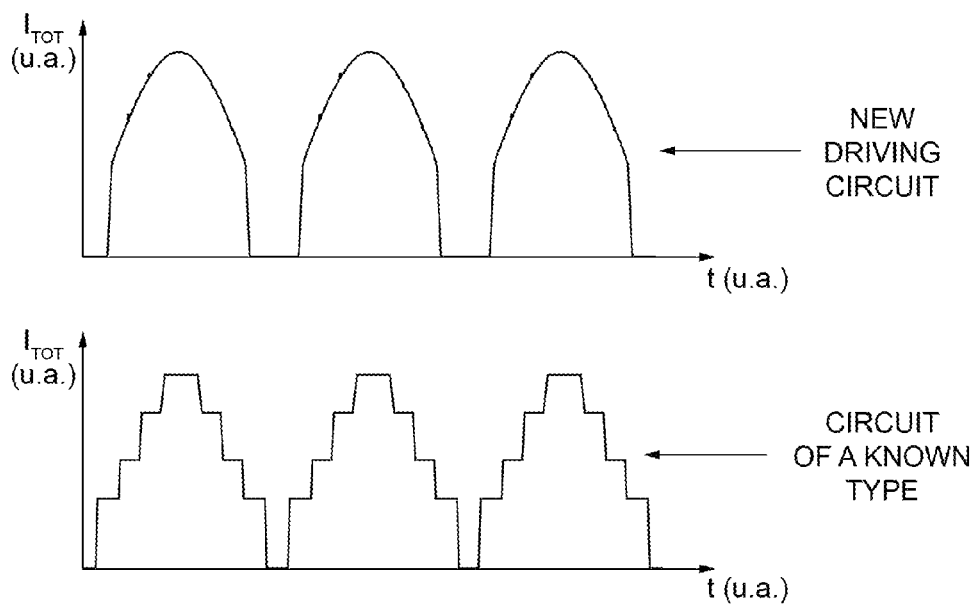
FIG. 7 shows plots of total currents generated in a driving circuit of a known type and in an embodiment of the driving circuit.

In particular, the present driving circuit enables good performance in terms of power factor and harmonic distortion to be obtained. In fact, the present driving circuit envisages generation of a current that follows the sinusoidal plot of the voltage $V_{in}$, instead of evolving by discrete levels, as is shown qualitatively in FIG. 7, where the total current that flows in the LED strings is represented both in the case of the present opto-electronic circuit and in the case of a circuit of a traditional type. In this connection, it may be noted how the plot of the total current is substantially sinusoidal when the voltage $V_{in}$ exceeds the first threshold voltage $V_{th1}$. The fact that the regulation modules enter and exit the regulation phase in sequence and without any sharp discontinuity concurs in rendering the plot of the total current more similar to that of a sinusoid.

The present driving circuit may further be implemented with low costs and small overall dimensions. In addition, thanks to the fact that the current in the LED strings is directly proportional to the input voltage, it is possible to use a single resistor (in the case in point, the external resistor 12) to define the nominal current that flows in the LEDs, and thus the light intensity supplied.

Figure 8:
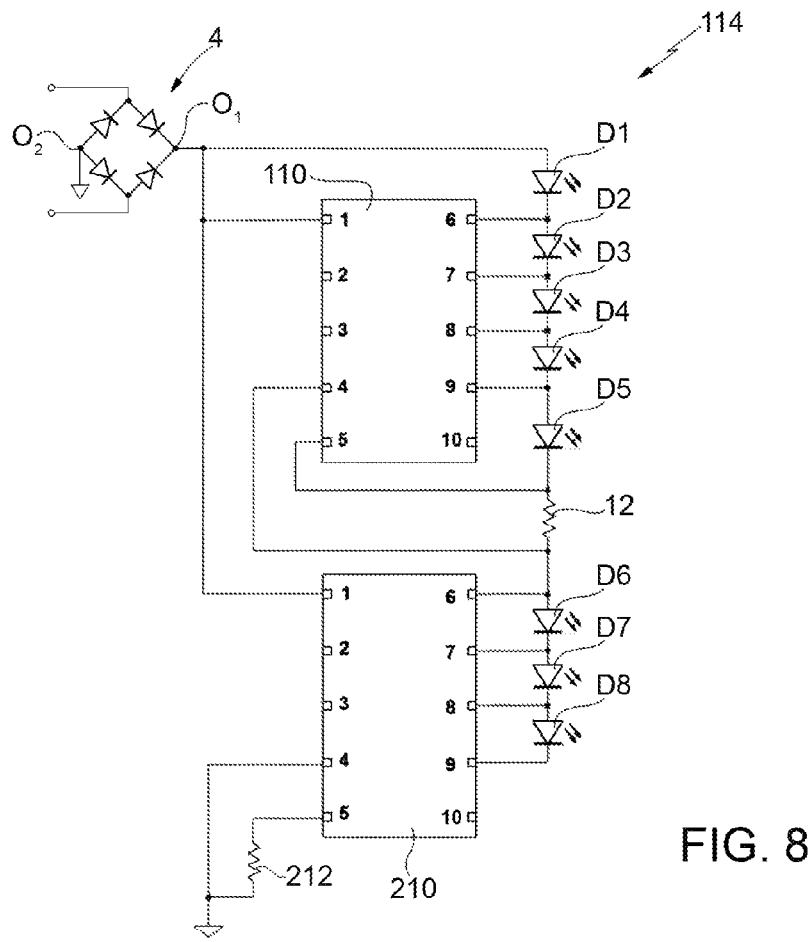
FIG. 8 shows a circuit diagram of an electronic system comprising a pair of electronic driving circuits.

The present driving circuit is suited further to being used in a cascade of circuits, as illustrated for example in FIG. 8.

In particular, FIG. 8 shows an electronic system 114, including a first electronic driving circuit and a second electronic driving circuit, designated, respectively, by 110 and 210 and of the same type as that described with reference to FIG. 2.

In greater detail, and without any loss of generality, each of the first and second electronic driving circuits 110, 210 is represented as an integrated electronic circuit (chip) with ten pins, where pin one is connected to the rectifier 4, whereas pins six, seven, eight, and nine are connected, respectively, to the drain terminals of the MOSFETs M1, M2, M3, M4 of the first, second, third, and fourth regulation module MREG1, MREG2, MREG3, MREG4; pin four is connected to the ground of the electronic driving circuit, whereas pin five is connected to the second terminal of the sensing resistor S4 of the fourth regulation module MREG4. Pins two, three, and ten are not used.

This having been said, the electronic system 114 further comprises the first, second, third, and fourth LED strings D1, D2, D3, D4 and the external resistor 12. Furthermore, the electronic system 114 comprises a fifth LED string D5, a sixth LED string D6, a seventh LED string D7, and an eighth LED string D8 and a further resistor 212, referred to hereinafter as the final resistor 212.

In greater detail, the first, second, third, and fourth LED strings D1, D2, D3, D4 and the external resistor 12 are connected to the first electronic driving circuit 110, as described in regard to FIG. 2, except for fact that between the cathode terminal of the fourth LED string D4 and the first terminal of the external resistor 12 the fifth LED string D5 is connected, the anode and cathode terminals of which are connected to the cathode terminal of the fourth LED string D4 and to the first terminal of the external resistor 12, respectively.

As regards the second electronic driving circuit 210, the respective pin six is connected to the second terminal of the external resistor 12, whereas pins seven, eight, and nine are connected, respectively, to the cathode terminals of the sixth, seventh, and eighth LED strings D6, D7, D8, as in the case of the first electronic driving circuit 110 and to the second, third, and fourth LED strings D2, D3, D4. Pin five of the second electronic driving circuit 210 is, instead, connected to a first terminal of the final resistor 212, the second terminal of which is connected to pin four of the second electronic driving circuit 210, as well as to the second output terminal $O_2$ of the rectifier 4.

In greater detail, the resistance $R_{ext}$ of the external resistor 12 is higher than the resistance of the final resistor 212. For instance, the resistance $R_{ext}$ of the external resistor 12 may be equal to 10Ω, whereas the resistance of the final resistor may be equal to 7Ω.

In practice, the second terminal of the external resistor 12 functions as reference node for the first electronic driving circuit 110, whereas the second terminal of the final resistor 212 is connected to the ground of the rectifier 4. In this connection, albeit not illustrated, the ground of each electronic driving circuit is connected to the operational amplifiers contained therein and is further shared with the reference generator 14.

This having been said, in use the first, second, third, fourth, fifth, sixth, seventh, and eighth LED strings D1, D2, D3, D4, D5, D6, D7, and D8 enter and exit the regulation phase in succession, in a way similar to what has been described with reference to FIG. 2.

In general, the use of a cascade of electronic driving circuits enables optimisation of the efficiency with which a large number of LED strings is supplied.

In conclusion, it is clear that modifications and variations may be made to what has been described and illustrated herein, without thereby departing from the scope of the present invention, as defined in the annexed claims.

For instance, the peak detector 22 may be of a type different from what has been described. In general, the reference generator 14 may be different from what has been described; for example, it may include just the voltage divider 20, in which case the reference voltage $V_{ref}$ does not have a normalized amplitude.

As regards the normalization circuit 33, it may be absent, or else, if present, it may be formed in a per se known manner and may possibly perform, for example, also the function of the multiplier 26.

The transistors may be of a type different from what has been described. In addition, also the circuit diagram that makes it possible, within a regulation module, to weight in a different way the sensed voltage and the feedback voltage of the next module may be different. On the other hand, instead of the sensed voltage, it is possible to generate any quantity indicating the current that flows in the corresponding MOSFET.

The differential amplifier of each regulation module may amplify the voltage drop on the corresponding sensing resistor with a gain different from unity.

The values of the quantities mentioned in the present description may be different from the values provided by way of example previously.

In addition, it is possible for one or more of the regulation modules to include circuit components different from what has been described. For instance, it is possible for there to be present, between the first operational amplifier and the MOSFET, a lowpass filter and/or a buffer in order to stabilise the electronic driving circuit. Furthermore, the functions of the adder circuit and of the differential amplifier may be performed by using a circuit diagram with a single amplifier. Again, between the first output terminal $O_1$ of the rectifier 4 and ground there may be connected a capacitor (not illustrated) with a capacitance for example equal to 10 nF in order to perform a further effect of filtering on the current at input to the cascade of LED strings.

One or more of the LED strings may include two respective branches in parallel, each branch being formed by a corresponding LED string. In this case, the threshold voltages of the two branches may be equal to one another in order to enable proper turning-on of both of the branches.

Finally, as mentioned previously, the electronic driving circuit 10 may form an electronic circuit of an integrated type; i.e., it may be integrated in a die of semiconductor material. In this case, one or more components of the reference generator 14 may be integrated in the die, or else may be made up of discrete components, external to the die. For instance, the voltage divider 20 and/or the peak detector 22 may be integrated in the die.

The invention claimed is:

1. An electronic circuit, comprising:
    a first regulation module having a first controlled current path coupling a cathode terminal of a first LED string to ground through a first resistor and a first control circuit for controlling conduction of the first controlled current path, said first control circuit comprising:
        a current sensing circuit configured to sense current flowing in said first controlled current path and generate a first signal indicative of sensed current;
        an adder circuit configured to add said first signal to a second signal indicative a voltage drop across said first resistor, said adder circuit generating a first feedback signal; and
        an error amplifier configured to generate a control signal for controlling conduction of the first controlled current path as a function of a difference between the first feedback signal and a reference signal.

2. The circuit of claim 1, wherein the first controlled current path includes a first transistor having a control terminal coupled to receive said control signal and a conduction path coupled between the cathode terminal of the first LED string and the first resistor.

3. The circuit of claim 1, further comprising:
    a second regulation module having a second controlled current path coupling a cathode terminal of a second LED string to ground through said first resistor and a second control circuit for controlling conduction of the second controlled current path, said second control circuit comprising:
        a current sensing circuit configured to sense current flowing in said second controlled current path and generate a third signal indicative of sensed current;

an adder circuit configured to add said third signal to said first feedback signal, said adder circuit generating a second feedback signal; and an error amplifier configured to generate a control signal for controlling conduction of the second controlled current path as a function of a difference between the second feedback signal and a reference signal.

4. The circuit of claim 3, wherein the second controlled current path includes a second transistor having a control terminal coupled to receive said control signal and a conduction path coupled between the cathode terminal of the second LED string and the first resistor.

5. The circuit of claim 3, wherein said second LED string is connected in series with the first LED string.

6. The circuit according to 1, further comprising a reference circuit configured to generate said reference voltage, wherein said reference circuit comprises a voltage divider configured to generate a reduced voltage, as a function of a rectified mains voltage.

7. The circuit according to claim 6, wherein said reference circuit further comprises a peak-detector circuit configured to generate a peak voltage proportional to the peak value of said reduced voltage; and wherein said reference circuit is configured to generate said reference voltage so that it is proportional to a ratio between the reduced voltage and the peak voltage.

8. An electronic circuit, comprising:
a resistor having a first terminal coupled to a node and a second terminal coupled to ground;
a first regulation module having a first controlled current path coupling a cathode terminal of a first LED string to said node and a first control circuit for controlling conduction of the first controlled current path;
a second regulation module having a second controlled current path coupling a cathode terminal of a second LED string to said node and a second control circuit for controlling conduction of the second controlled current path;
wherein the first control circuit operates to control the first controlled current path as a function of a reference voltage, a first signal indicative of current flowing through the first controlled current path and a second signal indicative of current flowing through said resistor; and
wherein the second control circuit operates to control the second controlled current path as a function of the reference voltage, a third signal indicative of current flowing through the second controlled current path and a fourth signal output from the first control circuit.

9. The circuit of claim 8, wherein each of the first and second control circuits operates to control the controlled current path as a function of a reference voltage and a signal indicative of current flowing through the controlled current path.

10. The circuit according to 9, further comprising a reference circuit configured to generate said reference voltage, wherein said reference circuit comprises a voltage divider configured to generate a reduced voltage, as a function of a rectified mains voltage.

11. The circuit according to claim 10, wherein said reference circuit further comprises a peak-detector circuit configured to generate a peak voltage proportional to the peak value of said reduced voltage; and wherein said reference circuit is configured to generate said reference voltage so that it is proportional to a ratio between the reduced voltage and the peak voltage.

12. The circuit of claim 8, wherein the fourth signal is a sum of the first signal and the second signal.

13. The circuit according to 12, further comprising a reference circuit configured to generate said reference voltage, wherein said reference circuit comprises a voltage divider configured to generate a reduced voltage, as a function of a rectified mains voltage.

14. The circuit according to claim 13, wherein said reference circuit further comprises a peak-detector circuit configured to generate a peak voltage proportional to the peak value of said reduced voltage; and wherein said reference circuit is configured to generate said reference voltage so that it is proportional to a ratio between the reduced voltage and the peak voltage.

15. The circuit of claim 8, wherein said second LED string is connected in series with the first LED string.

16. An electronic circuit, comprising:
a resistor having a first terminal coupled to a node and a second terminal coupled to ground;
a first regulation module having a first controlled current path coupling a cathode terminal of a first LED string to said node and a first control circuit for controlling conduction of the first controlled current path in response to a first feedback voltage derived from a sum of a voltage drop across said resistor and a voltage drop across a first sense resistor coupled in series with the first controlled current path; and
a second regulation module having a second controlled current path coupling a cathode terminal of a second LED string to said node and a second control circuit for controlling conduction of the second controlled current path in response to a second feedback voltage derived from a sum of the first feedback voltage and a voltage drop across a second sense resistor coupled in series with the second controlled current path.

17. The circuit of claim 16,
wherein the first control circuit further includes an error amplifier configured to determine a first difference between a reference voltage and the first feedback voltage and use the first difference to control controlling of the first controlled current path; and
wherein the second control circuit further includes an error amplifier configured to determine a second difference between said reference voltage and the second feedback voltage and use the second difference to control conduction of the second controlled current path.

18. The circuit according to 17, further comprising a reference circuit configured to generate said reference voltage, wherein said reference circuit comprises a voltage divider configured to generate a reduced voltage, as a function of a rectified mains voltage.

19. The circuit according to claim 18, wherein said reference circuit further comprises a peak-detector circuit configured to generate a peak voltage proportional to the peak value of said reduced voltage; and wherein said reference circuit is configured to generate said reference voltage so that it is proportional to a ratio between the reduced voltage and the peak voltage.

* * * * *

UNITED STATES PATENT AND TRADEMARK OFFICE
CERTIFICATE OF CORRECTION

PATENT NO. : 9,918,364 B2
APPLICATION NO. : 15/604811
DATED : March 13, 2018
INVENTOR(S) : Davide Lena et al.

Page 1 of 1

It is certified that error appears in the above-identified patent and that said Letters Patent is hereby corrected as shown below:

On the Title Page

Item (30) Foreign Application Priority Data is missing. Please add as follows:

(30)    Foreign Application Priority Data
Dec. 31, 2015   (IT) ...................... 102015000089452

Signed and Sealed this
Tenth Day of July, 2018

Andrei Iancu
*Director of the United States Patent and Trademark Office*